United States Patent
Kotov et al.

(10) Patent No.: US 11,907,280 B2
(45) Date of Patent: Feb. 20, 2024

(54) TEXT ADJUSTED VISUAL SEARCH

(71) Applicant: ADOBE INC., San Jose, CA (US)

(72) Inventors: Mikhail Kotov, Austin, TX (US); Roland Geisler, San Francisco, CA (US); Saeid Motiian, San Francisco, CA (US); Dylan Nathaniel Warnock, Austin, TX (US); Michele Saad, Austin, TX (US); Venkata Naveen Kumar Yadav Marri, San Jose, CA (US); Ajinkya Kale, San Jose, CA (US); Ryan Rozich, Austin, TX (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/090,150

(22) Filed: Nov. 5, 2020

(65) Prior Publication Data
US 2022/0138247 A1 May 5, 2022

(51) Int. Cl.
*G06F 17/00* (2019.01)
*G06F 7/00* (2006.01)
*G06F 16/532* (2019.01)
*G06F 16/2457* (2019.01)
*G06F 16/538* (2019.01)
*G06F 16/583* (2019.01)

(52) U.S. Cl.
CPC ...... *G06F 16/532* (2019.01); *G06F 16/24578* (2019.01); *G06F 16/538* (2019.01); *G06F 16/5846* (2019.01)

(58) Field of Classification Search
CPC .. G06F 16/532; G06F 16/538; G06F 16/5846; G06F 16/24578

USPC ......................................................... 707/728
See application file for complete search history.

(56) References Cited

U.S. PATENT DOCUMENTS

| | | | |
|---|---|---|---|
| 2009/0319512 A1* | 12/2009 | Baker | G06F 16/00 707/999.005 |
| 2010/0086278 A1* | 4/2010 | Stankiewicz | G06V 10/462 705/348 |
| 2010/0205202 A1* | 8/2010 | Yang | G06F 16/532 707/767 |
| 2013/0254184 A1* | 9/2013 | Ellsworth | G06Q 10/06 707/E17.014 |
| 2013/0304595 A1* | 11/2013 | Goncalves | G06T 7/001 705/22 |

(Continued)

*Primary Examiner* — Pavan Mamillapalli
(74) *Attorney, Agent, or Firm* — Shook, Hardy & Bacon L.L.P.

(57) ABSTRACT

Embodiments of the technology described herein, provide improved visual search results by combining a visual similarity and a textual similarity between images. In an embodiment, the visual similarity is quantified as a visual similarity score and the textual similarity is quantified as a textual similarity score. The textual similarity is determined based on text, such as a title, associated with the image. The overall similarity of two images is quantified as a weighted combination of the textual similarity score and the visual similarity score. In an embodiment, the weighting between the textual similarity score and the visual similarity score is user configurable through a control on the search interface. In one embodiment, the aggregate similarity score is the sum of a weighted visual similarity score and a weighted textual similarity score.

19 Claims, 8 Drawing Sheets

(56) References Cited

U.S. PATENT DOCUMENTS

| | | | |
|---|---|---|---|
| 2015/0169645 A1* | 6/2015 | Li | G06F 16/532 |
| | | | 707/722 |
| 2015/0199369 A1* | 7/2015 | Daly | G06F 16/24578 |
| | | | 707/748 |
| 2017/0039198 A1* | 2/2017 | Ramamurthy | G06F 16/93 |
| 2017/0255647 A1* | 9/2017 | Zhu | G06F 16/24578 |
| 2017/0255652 A1* | 9/2017 | Kong | G06F 16/5866 |
| 2017/0286867 A1* | 10/2017 | Bell | G06N 20/00 |
| 2017/0351710 A1* | 12/2017 | Zhu | G06F 16/24578 |
| 2018/0260698 A1* | 9/2018 | Lin | G06V 10/82 |

* cited by examiner

TEXT ADJUSTED VISUAL SEARCH

BACKGROUND

A visual search identifies one or more images that are visually similar to a search input image. Visual similarity can be a good way to identify images of aesthetically similar objects where the aesthetic similarities are difficult to describe using words. For example, a visual search might do a better job identifying two similar paintings than a word search that uses descriptions of the two paintings.

However, visual searches can also miss distinctions that would be apparent in a word search using the image descriptions. Often visual searches are used to identify objects in an image that are of interest to user, rather than the image itself. For example, a user may be interested in a wig of a certain style, not just the picture of the wig. If the search input image is of a wig, ideally, only images of wigs would be returned as search results. However, an image analysis may have a difficult time differentiating a wig from real hair. Thus, a visual search result set that is generated based on an image of a wig would likely include images of people in wigs and without wigs. There is a need to improve visual searches using text associated with the search image and result images.

SUMMARY

Embodiments of the technology described herein, provide improved visual search results by combining a visual similarity and a textual similarity between images. In an embodiment, the visual similarity is quantified as a visual similarity score and the textual similarity is quantified as a textual similarity score. The textual similarity is determined based on text, such as a title, associated with the image. The overall similarity of two images is quantified as a weighted combination of the textual similarity score and the visual similarity score. In an embodiment, the weighting between textual similarity score and the visual similarity score is user configurable through a control on the search interface.

The search process starts with a search image. The goal of the visual search is to find images that are visually similar to the search image. Next, the technology described herein generates a visual similarity score. In an embodiment, the visual similarity score is used to generate a first plurality of images that are visually similar to the search image. As explained in detail herein, the visual similarity score is determined by taking a similarity measure (e.g., cosine similarity) of an embedding of the search image and an embedding of a second image. Embodiments are not limited to use with cosine similarity and other similarity measures may be used. Using a visual similarity score to generate the initial plurality of relevant images ensures that all of the images in the presented search result page have a visual similarity to the search image. The textual similarity may be used to re-rank images in the first plurality using a weighted combination of the visual and textual similarity.

A textual similarity is generated for each image in the first plurality of relevant images previously identified by the visual similarity score. As explained in detail herein, the textual similarity score is determined by taking a similarity measure of an embedding of the text associated with search image and an embedding of text associated with a second image. Different types of text from the image can be used. In one embodiment, the text used is a title of the image. In another embodiment, keywords are extracted from a description of the image to generate a textual similarity score.

The visual similarity score and the textual similarity score are used to generate an aggregate similarity score for an image. In an example, the aggregate similarity score is the sum of a weighted visual similarity score and a weighted textual similarity score. The weighted visual similarity score is the determined visual similarity score multiplied by a visual weight. The weighted textual similarity score is the determined textual similarity score multiplied by the textual weight. In one embodiment, the sum of the textual weight and visual weight may be one. For example, the visual weight could be 0.7 and the textual weight could be 0.3.

In an embodiment, a user is able to adjust these weights through a control on the search result page. The control allows the user to increase or decrease the visual weight and/or the textual weight. As the weight is adjusted by the user, the results shown change based on a recalculation of the aggregate similarity score for search result image. The results shown are selected and ordered according to the aggregate similarity score assigned to the result.

DETAILED DESCRIPTION

Overview

Figure 1:
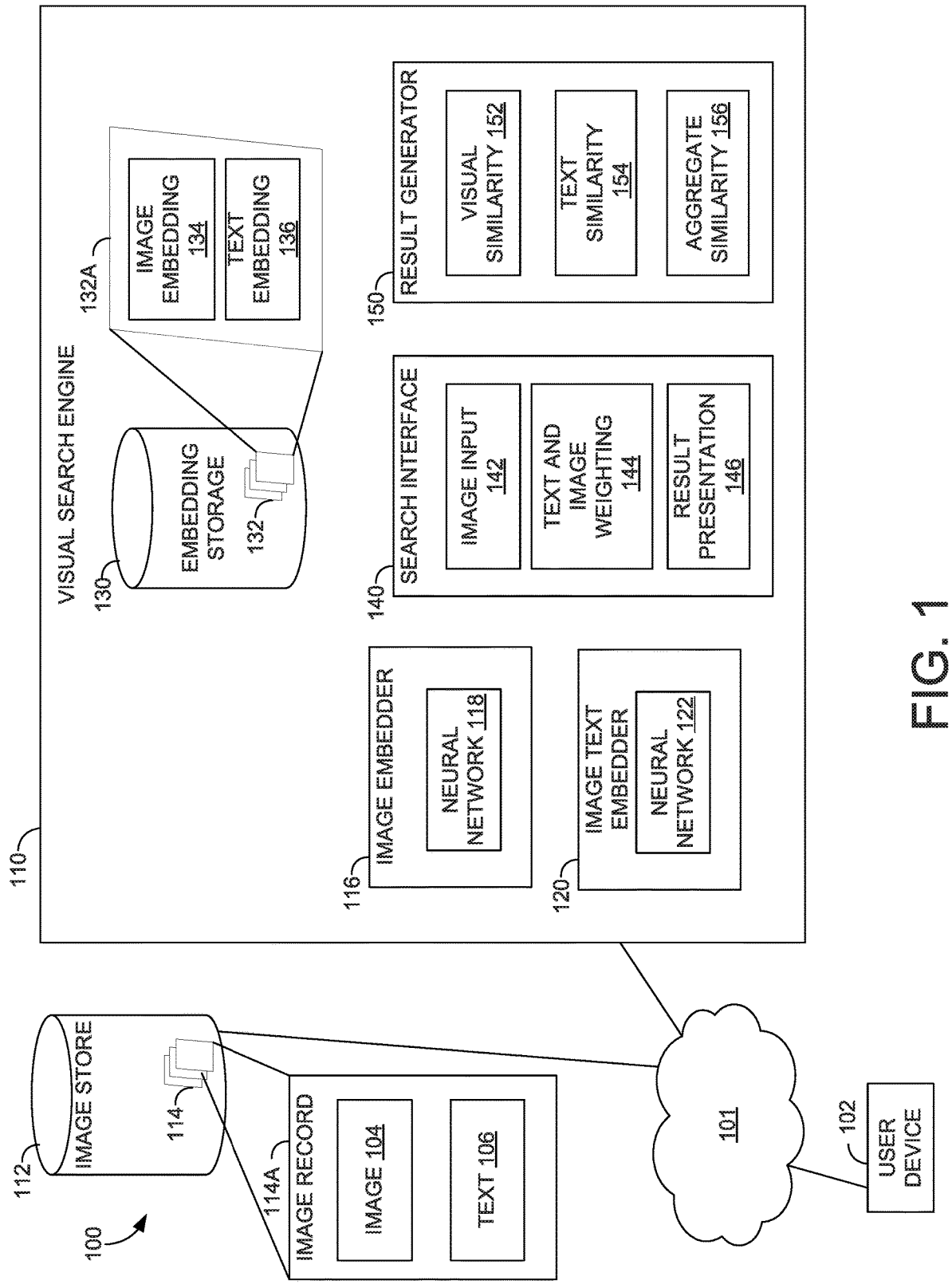
FIG. 1 provides a block diagram of a visual search system, in which embodiments described herein may be employed.

Embodiments of the technology described herein, provide improved visual search results by combining a visual similarity and a textual similarity between images. In an embodiment, the visual similarity is quantified as a visual similarity score and the textual similarity is quantified as a textual similarity score. The textual similarity is determined based on text, such as a title, associated with the image. The overall similarity of two images may be quantified as a weighted combination of the textual similarity score and the visual similarity score. In an embodiment, the weighting between the textual similarity score and the visual similarity score is user configurable through a control on the search interface.

Embodiments of the technology described herein help solve a cold start problem that occurs when a new image is added to a database. The root of the cold start problem is a lack of user interaction data associated with a new image. Many current visual search technologies utilize user interaction data to refine the ranking of visual search results. The user data, such as a single user browsing or otherwise interacting with multiple images, provides an additional signal that may be used in combination with a visual similarity to determine overall similarity in combination with visual similarity. User interaction data conveys a strong similarity signal because user actions can represent a user's judgment of the images. For example, a user is likely to know the difference between images of a wig and human hair and interact with images of just one or the other during a given browsing session. A single user interacting with a group of images depicting people wearing wigs is a type of user interaction data that can be used to differentiate visually similar images of wigs and human hair. Since new images may not have user data when added to a system, they are not likely to be accurately scored based on the user interaction data. Embodiments of the technology described herein may identify visually similar images without user interaction data. The technology may identify visually similar images without user interaction data because user data is not available for one or more images or for any other reason, such as a system design choice.

Instead of user interaction data, the technology described herein can use text associated with the search image and text associated with visually similar images as a secondary signal to identify the search results ultimately presented to the user.

The search process starts with a search image. The goal of the visual search is to find images that are visually similar to the search image. In one embodiment, the search image is designated by a user as part of a visual search. In another embodiment, the search image is automatically selected to create a user experience. For example, a website with a similar image section (e.g., "you may also be interested in") that is automatically populated with images similar to an image being viewed on the website will automatically select a search image without explicit user input. For example, an e-commerce site may present images of products similar to a product being viewed by a user. In this case, the image of a product being viewed is automatically selected as a search input.

The technology described herein generates a visual similarity score. In an embodiment, the visual similarity score is used to generate a first plurality of images that are visually similar to the search image. As explained in detail herein, the visual similarity score is determined by taking a similarity measure (e.g., cosine similarity) of an embedding of the search image and an embedding of a second image. Embodiments are not limited to use with cosine similarity and other similarity measures may be used. In general, the first plurality of relevant images may include more than an amount of images to be presented in the search results. For example, the first plurality of relevant images may include five times, 10 times, or 15 times the amount of search results to be presented. Thus, if the search result page presents 10 relevant images then 50 or 100 images may be identified initially through visual similarity. Using a visual similarity score to generate the initial plurality of relevant images ensures that all of the images in the ultimate search result page have a visual similarity to the search image. The textual similarity may be used to re-rank images in the first plurality using a weighted combination of the visual and textual similarity.

The visual similarity score and the textual similarity score are used to generate an aggregate similarity score for an image. In one embodiment, the aggregate similarity score is the sum of a weighted visual similarity score and a weighted textual similarity score. The weighted visual similarity score is the determined visual similarity score multiplied by a visual weight. The weighted textual similarity score is the determined textual similarity score multiplied by the textual weight. In one embodiment, the sum of the textual weight and visual weight may be one. For example, the visual weight could be 0.7 and the textual weight could be 0.3.

In an embodiment, a user is able to adjust these weights through a control on the search result page. The control allows the user to increase or decrease the visual weight and/or the textual weight. As the weight is adjusted by the user, the results shown change based on a recalculation of the aggregate similarity score for search result image. The results shown are selected and ordered according to the aggregate similarity score assigned to the result.

Visual Search System

With reference to FIG. 1, FIG. 1 illustrates an example visual search environment 100 in which methods of the present disclosure may be employed. In particular, FIG. 1 shows a high level architecture and operations of the visual search engine 110 in accordance with implementations of the present disclosure. In one embodiment, the visual search engine 110 runs in one or more data centers. The results generated by the visual search engine 110 may be communicated over a network 101 to a user device 102. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASIC s), Application-specific Standard Products (ASSPs), System-on-a-chip systems (SOCs), Complex Programmable Logic Devices (CPLDs), etc. Additionally, although functionality is described herein regarding specific components shown in example system 100, it is contemplated that in some embodiments functionality of these components are shared or distributed across other components. For example, some components shown as part of the visual search engine 110 can alternatively or additionally reside on the user device 102.

Among other components not shown, the visual search environment 100 includes network 101, user device 102, an image store 112, and a visual search engine 110. The network 101 can take different forms including, without limitation, one or more local area networks (LANs) and/or wide area networks (WANs). In exemplary implementations, network 101 comprises the Internet and/or a cellular network, amongst any of a variety of possible public and/or private networks.

The user device 102 is alternatively described herein as a client device on the client-side of environment 100, while the visual search engine 110 may be described as the server-side of operating environment 100. The user device 102 is any type of computing device capable of use by a user. For example, in one embodiment, user device 102 is of the type of computing device described in relation to FIG. 7 herein. In various embodiments, the user device 102 is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The image store 112 stores a plurality of image records 114. Image record 114A is an example image record. The image store 112 may be part of a content service, such as an e-commerce website or backend service for an e-commerce application. In an embodiment, the image store 112 serves images to any number of other components shown or not shown for multiple different purposes. The visual search engine 110 is able to access the image records 114 in the image store 112 for the purpose of performing visual searches. The visual search engine 110 can return images and/or image records 114 from the image store 112 in response to a search query. In an embodiment, the image store 112 comprises image records 114 copied from another source. In this embodiment, the image store 112 is dedicated for use with the visual search engine 110.

The image record 114A is an example of one of a plurality of records 114 stored in the image store 112. The image record 114A includes an image 104 and text associated with the image 106. The image 104 may conform to a set of parameters for inclusion in the image store 112. For example, the image 104 may have a designated size, pixel density, and the like. The image is formatted according to any of a number of available digital image formats, such as PNG (Portable Network Graphics), GIF (Graphic Interchange Format), or JPEG or JPG (Joint Photographic Experts Group). The text 106 may follow an attribute schema or be unstructured text or a combination of both. The text 106 may describe characteristics of the image and/or objects depicted in an image. For example, the text 106 may describe a commercial product depicted in an image. Using the example of a dress shown in FIG. 3, the text 106 could include a dress size, dress designer, price, a vendor, material of construction, a title, an unstructured textual description, and the like. In one embodiment, the text 106 is used by a non-visual search engine to determine a relevance of an object depicted in an associated image to a textual search query. In one embodiment, the text 106 includes an unstructured description added by a user when posting the image 106 on social media.

The visual search engine 110 includes an image embedder 116, an embedding neural network 118, an image text embedder 120, a text embedding neural network 122, an embedding storage 130, a search interface 140, and a result generator 150. The search interface 140 includes an image input component 142, a text and image weighing component 144, and a result presentation component 146. The result generator 150 includes a visual similarity component 152, a textual similarity component 154, and aggregate similarity component 156.

The image embedder 116, in combination with the embedding neural network 118, receives an image from the image store 112 and generates an image embedding. An embedding is a translation of a high-dimensional vector into a low-dimensional space. For example, an image embedding translates image features into a vector that can be used for a similarity determination. The image embedding may be sent to the embedding storage component 130 to create an embedding record 132A. In an embodiment, an image embedding takes the form of a feature vector, which is a representation of an image in an N-dimensional vector. The basic idea is the closer a given image is to another image, the more similar their embeddings will be in spatial dimension. The embedding neural network 118 is trained to identify both high level image features and low level image features. In general, low-level image features are minor details of the image, such as lines, edges, corners or dots. High-level features are built on top of low-level features to detect objects and larger shapes in the image.

The embedding neural network 118 is an Artificial Neural Network (ANN) in one embodiment. An ANN is a computing processing module in hardware or software that is inspired by elements similar to those found in a biological neuron. For example, a variable input vector of length N scalar elements $v_1, v_2, \ldots v_N$ are weighted by corresponding weights $w_i$, and to an additional bias $b_0$, and passed through hard or soft non-linearity function $h(\ )$ to produce an output. In an embodiment, the nonlinearity is for example a sign function, a tanh function, a function that limits the maximum and/or minimum value to a programmable output, or a ReLU function. An ANN may produce output equal to $h\ (v_1{}^*w_1 + v_2{}^*w_2 + \ldots + v_N{}^*w_N + b_0)$. Such networks "learn" based on the inputs and on a weight adjustment method. Weights may be adjusted iteratively based on evaluating the ANN over a data set while modifying the weights in accordance with a learning object. One or more classification techniques may be used, such as gradient boosted decision tree binary classification. In an embodiment, decision trees may be used as classifiers since decision trees may be easier to visualize and integrate into practical solutions.

Figure 2:
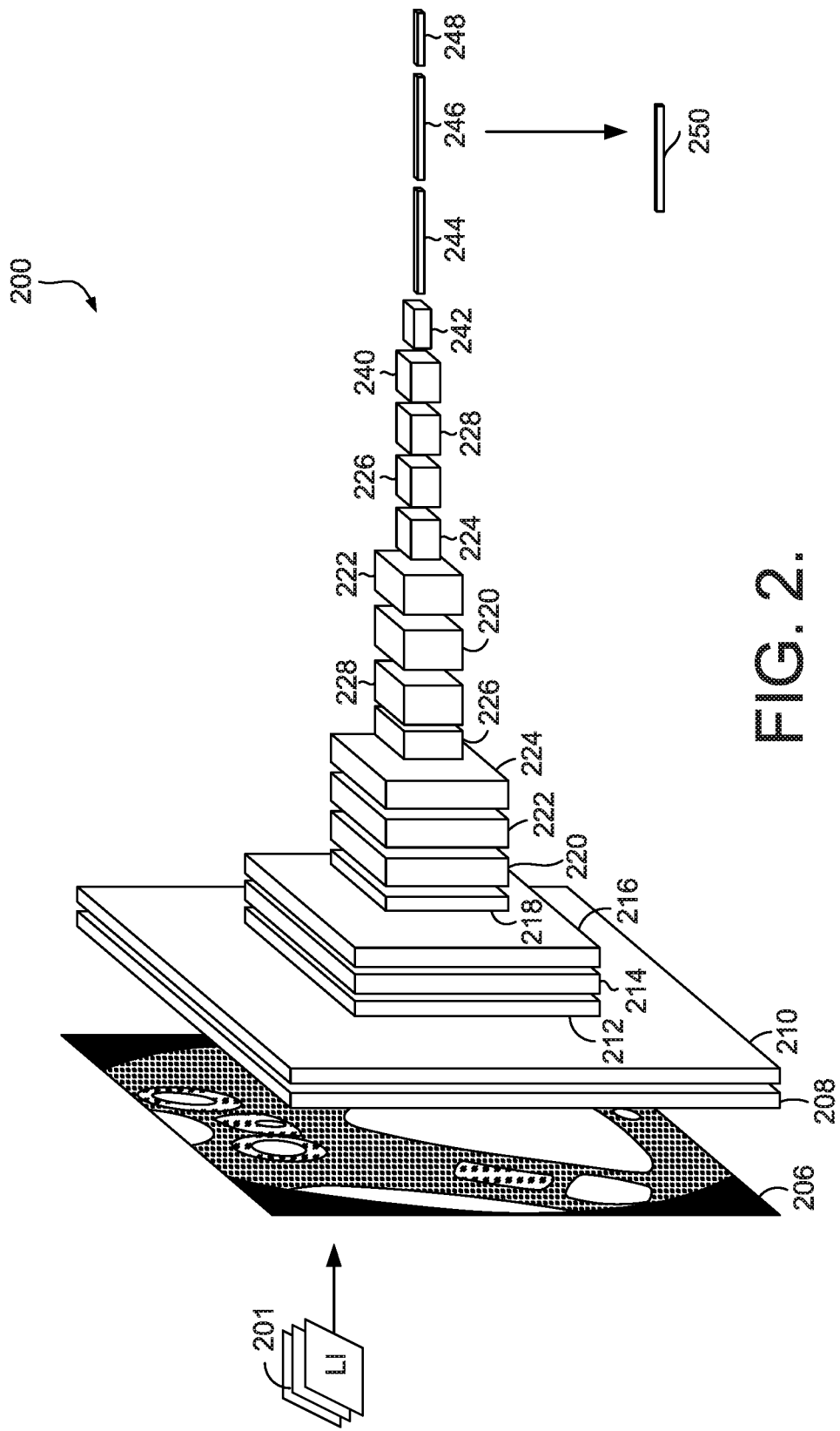
FIG. 2 is an illustration of a neural network used to generate an image embedding, in accordance with embodiments of the technology described herein.

In one embodiment, the embedding neural network 118 is a convolutional neural network (CNN), such as CNN 200 shown in reference to FIG. 2. The description of FIG. 2 describes both training the CNN and using the CNN to generate an image embedding. A convolutional neural network is an ANN that performs operations using convolution operations, often for image data. A CNN may have several layers of networks that are stacked to reflect higher-level neuron processing. A CNN neurons may be fully connected or partially connected to a succeeding layer. One or more layers may be skipped in providing a neuron output to a higher layer. The convolutions may be performed with the same resolution as the input, or a data reduction may occur with the use of a stride different from 1. The output of a layer may be reduced in resolution through a pooling layer. A CNN may be composed of several adjacent neurons, which only process inputs in a receptive field that is much smaller than the entire image. Example CNN arrangements include ZF Net, AlexNet, GoogLeNet, LeNet, VGGNet, VGG, ResNet, DenseNet, etc.

A convolutional layer is a layer of processing in a CNN hierarchy. A layer is a set of adjacent neurons that have a small and adjacent receptive field. A CNN may have a number of defined layers. In an embodiment, the number of network layers may be defined within a CNN component, such as 6-layers, 16-layers, 19-layers or 38-layers.

In an embodiment, the first couple of convolutional layers may be selected as filters for finding low-level features, while the later layers will learn to recognize common shapes and objects. In one embodiment, the embedding neural network 118 is a convolutional neural networks (CNN), such as shown in reference to FIG. 2.

In some embodiments, image pre-processing is performed prior to feeding the image to the embedding neural network 118. Exemplary pre-processing includes decoding the image to W×H×3 shaped tensor, resizing the image/shape tensor, and converting the data type of the tensor, if needed, to the type required by the model.

The image text embedder 120, in combination with the embedding neural network 122, receives text from the image store 112 and generates a text embedding. The text embedding are sent to the embedding storage component 130 to create an embedding record 132A.

The text embedding neural network 122 may use a character n-gram model, such as the Word2vec model. Word2vec is not a single algorithm but a combination of two techniques—CBOW (Continuous bag of words) and Skip-gram model. Both of these are shallow neural networks that map word(s) to the target variable. Both of these techniques learn weights which act as word vector representations. The text embedding converts a word or string of words into one or more vectors representing the words.

As an alternative, the word embeddings are generated deterministically in some applications. The deterministic embedding methods do not use a neural network and embedding neural network 122 would not be used in deterministic embedding embodiments.

The embedding store 130 comprises computer storage media for use storing embedding records 132 used by the visual search engine 110 to make a similarity determination. In one embodiment, image records 114 are pre-processed to generate embedding records that are used in future visual searches. In one aspect, new images are pre-processed after being added to the image records 114 creating embedding records that are added to the existing embedding records 132. As illustrated by embedding record 132A, each embedding record includes an image embedding 134 and a text embedding 136. In one aspect, the embedding record 132A is associated with an image record 114. The association allows the image associated with image record to be retrieved in response to determining that an image embedding is similar to an embedding of the search image. The embedding record 132A can be used to identify the visual similarity and a textual similarity of two images. The image embedding 134 is used to determine a visual similarity while the text embedding 136 is used to determine a textual similarity.

The search interface 140 is, at least partially, responsible for creating the user search experience. In a client/server arrangement, the search interface 140 may communicate with client-side applications through one or more application programming interfaces adapted for visual search. The search interface 140 generated on the client side can take the form of a graphical user interface shown in a browser or through an application running on a smart phone or other device. An exemplary search interface 140 is described with reference to FIG. 3. The search interface 140 receives search input, such as a designated search image, and outputs visual search results. The search interface 140 works with other components, such as the result generator 150, to identify relevant search results and then communicate the results for display.

The image input component 142 receives the search image that is used to generate search results. In one aspect, receiving the search engine includes receiving identification information for an image record in the image store 112. The identification information may also be used to identify an embedding record for the search image. In one embodiment, the search image is selected explicitly by a user as an input for a visual search. For example, a website offering a visual search service based on images presented by the website may provide instructions to a user inviting the user to select an image as a search input. In the case of a client-side application generating the actual search interface, the client-side application will communicate the search image and/or identification information for the image over the network 101. The image input component 142 sends the search image and/or identification information for the search image to the result generator 150 to identify similar images.

The text and image weighting component 144 receives text and/or image weighting data. Initially, if a custom weight is not specified by a user, the text and image weighting component 144 may designate a default weighting. In one embodiment, the default weight is derived from user interaction data. In one example, the default weight is the average weight users select for visual searches across a platform. In another example, the default weight is based on a known characteristic of the search image. If the search image is characterized as clothing, for example, then the default weight could be an average weight users select when performing visual searches in the clothing subject matter space. In another example, the default weight is the last weight set by the user to whom search results will be presented. The default weighting may be communicated to the result generator for an initial result.

However, embodiments of the technology described herein can allow the user to customize the weighting before or after visual search results are shown. When a user customization of the weighting is received, for example through manipulation of a weighting control shown in FIG. 3, then the text and image weighting component 144 may communicate the custom weighting to the aggregate similarity component 156. As described herein, the aggregate similarity component 156 uses the weighting to combine the visual similarity of an image with the textual similarity of the image.

The result presentation component 146 selects results for inclusion in the visual search result output based on the aggregate similarity score assigned by the aggregate similarity generator 156. In one embodiment, the result presentation component 146 simply selects the top threshold of search results and generates an instruction to display them in order of aggregate similarity score. However, the result presentation component 146 may consider other factors beyond the aggregate similarity score when selecting and ordering results. In one embodiment, the result presentation components 146 follows rules that down ranks or even excludes relevant images in certain situations. For example, in an e-commerce environment, the images shown may be limited to those with products in stock, products fitting into a price range known to be of interest to a user, products that are part of a loyalty program, and the like.

The result presentation component 146 prepares search results in a format suitable for presentation on a particular device (e.g., user device 102) and/or suitable for a particular program generating a user interface through which the results are to be presented. In one example, the search result includes an image and all or part of the text used to generate the text similarity score for the image.

The result generator 150 identifies images that are similar to a search image. The similarity is determined according to the aggregate similarity score. The result generator 150 communicates the similar images to the search interface 140.

The visual similarity component 152 performs a visual similarity analysis between an image embedding of the search image and image embeddings of other images within the embedding storage 130. The result of the visual similarity analysis is a visual similarity score that quantifies a similarity between the search image and a second image. The visual similarity score is determined by taking a cosine similarity, L2 norm, or some other similarity measure of an embedding of the search image and an embedding of the second image. Embodiments are not limited to use with cosine similarity or L2 norm. Other similarity measures may be used.

In an embodiment, the visual similarity score is used to generate a first plurality of relevant images assigned the highest visual similarity scores. In general, the first plurality of relevant images may include a threshold amount of images where the threshold is more than an amount of images to be presented as part of the search results. For example, the first plurality of relevant images may include five times, 10 times, or 15 times the amount of search results to be presented. Thus, if the search result page presents 10 relevant images then 50 or 100 images may be identified initially through visual similarity. In another example, the threshold amount is determined by including images with a visual similarity score above a threshold score (where a high score indicates a high degree of similarity).

Using a visual similarity score to generate the initial plurality of relevant images ensures that the images in the ultimate search result page bear a visual similarity to the search seed. Using visual similarity as an initial screen or filter is different from first combining the visual and textual similarity of an image and will often produce different results. For example, in some scenarios an initial combination of textual similarity and visual similarity would cause images to be included in the first plurality that are not included when only visual similarity is used. The textual similarity may be used to re-rank images in the first plurality using a weighted combination of the visual and textual similarity.

The textual similarity component 154 performs a textual similarity analysis between a textual embedding of the search image and a textual embedding of other images within the embedding storage 130. The result of the textual similarity analysis is a textual similarity score that quantifies a similarity between the search image and a second image. The textual similarity score may be determined by taking a cosine similarity, L2 norm, or some other similarity measure of the embeddings.

The aggregate similarity component 156 calculates an aggregate similarity between the search image and another image. In one embodiment, an aggregate similarity score is generated for each image in the first plurality of images. In one embodiment, the aggregate similarity score is the sum of a weighted visual similarity score and a weighted textual similarity score. The weighted visual similarity score is the previously calculated visual similarity score multiplied times the visual weight. The weighted textual similarity score is the previously calculated textual similarity score multiplied times the textual weight. In one embodiment, the sum of the textual weight and visual weight is one. For example, the visual weight could be 0.7 in the textual weight could be 0.3.

These weights are adjustable by a user through a search result page. The search result page includes a control that allows the user to increase or decrease the visual weight and/or the textual weight. As the weight is adjusted by the user, the results shown change in response to a recalculation of the aggregate similarity score for search result images. The results shown are selected and ordered according to the aggregate similarity score assigned to the result. The changing weight can change both images shown and the order of images shown. The aggregate similarity component 156 provides scores to the result presentation component 146.

Turning now to FIG. 2, an exemplary embedding model architecture 200 is depicted. The embedding neural network 118 can use embedding model architecture 200. The embedding model architecture 200 shown is a convolutional deep network, but other model types may be used in embodiments of the invention. Embedding model architecture 200 follows the VGG-16 architecture. The local model includes 21 layers including 13 convolutional layers, 5 max pooling layers, and 3 fully connected layers.

The convolutional layers comprise a first convolutional layer 206, a second convolutional layer 208, a third convolutional layer 212, a fourth convolutional layer 214, a fifth convolutional layer 218, a sixth convolutional layer 220, a seventh convolutional layer 222, an eight convolutional layer 226, a ninth convolutional layer 228, a tenth convolutional layer 230, an eleventh convolutional layer 234, a twelfth convolutional layer 236, and a thirteenth convolutional layer 238). The first convolutional layer 206 and the second convolutional layer 208 each have 64 filters. The third convolutional layer 212 and the fourth convolutional layer 214 each have 128 filters. The fifth convolutional layer 218, the sixth convolutional layer 220, and the seventh convolutional layer 222 each comprise 256 filters. The remaining convolutional layers have 512 filters.

The max pooling layer 240 is followed by three fully connected layers (a first fully-connected layer 244, a second fully-connected layer 246, and an output layer 248). The first convolutional layer 206 servers as the input layer and may receive a 224×224 pixel image. Each pooling layer (210, 216, 222, 240, and 242) performs a 2×2 pooling operation. Embodiments of the technology described herein are not limited to this arrangement. The embedding 250 can be the output of the last fully connected layer 246 or some other layer. For training purposes, the output layer's result 248 would be fed to a Sigmoid function, angular visual hardness function, or other function used to calculate a series of class indications, such as confidence factors. These functions are not shown and not used to generate an embedding. An actual classification is only produced during training.

The input layer converts the image into data that may be processed by the first convolutional layer 206. In one embodiment, the input layer comprises three layered arrays. Each node in the array represents a pixel in the image. Each array represents either red, green, or blue. In the red array, a node may be the intensity of red associated with the node's pixel. In this way, each pixel is represented by three nodes; one in each sub-layer within the input layer. The input layer 202 does not sufficiently obfuscate the image data as the image may be reproduced using the data stored in the input layer 202.

Initially, an image from search image 201 or any image for which an embedding is being generated, is processed as input. The processing occurs the same way whether in training or production mode. The only difference is that the neuron weights in the model may be changed after a classification is produced while in training mode. In this example, the image may be 224×224 pixels. The depth of input layer 202 may be described as three because each pixel may have a red, green, and blue (RGB) pixel intensity value.

The first convolutional layer 206 comprises multiple sublayers, described herein as feature maps. Each feature map (i.e., sublayer) may be associated with a different filter operation that is designed to detect a low-level feature. The filter operation may be described as a neuron's activation function. The goal of the filter may be to detect low-level shapes in an image, such as a curve or line. Each filter operation works on a group of pixels in the image that may be described as a receptive field. Each neuron in a sublayer has a different receptive filed. The output of the filter operation combined with a weight assigned to a neuron may be the neuron's output. For example, a filter operation on a 5×5×3 receptive field 204 of the input layer 202 may produce a single value. When combined with the weight of the neuron, the result is the output of a single neuron in the first convolutional layer 206. This process is repeated for adjacent neurons in the feature map, which will each use a different receptive field. The process may also be repeated on the same receptive field by each neuron in different feature maps within the convolutional layer using the filter operation associated with the respective feature map.

If the receptive field contains a sought after feature (e.g., a curve, honeycomb shape, a triangle), then a different number would result than if it did not. For example, a filter operation that did not find a sought after feature could return a zero value in contrast to a value of 1000 if the feature in the image exactly matched a feature in the filter.

The feature map is populated by running the same filter operation over different receptive fields of the input layer 202, eventually processing the entire input layer 202. Sections of the input layer 202 to be mapped are determined by the stride selected. The stride is a distance between center pixels of adjacent receptive fields. The adjacent receptive fields are associated with adjacent neurons. A stride of one pixel would cause the adjacent receptive field to have a center pixel adjacent to a center pixel in the first receptive field. A stride of two would cause the center pixel of a receptive field to move over two pixels. Embodiments of the technology may be used with different strides, such as a stride of 2, 4, or 6.

The first convolutional layer 206 comprises multiple feature maps; each feature map comprising an array of neurons populated using the same filter operation. The first feature map may look for curves, the second feature map may look for lines, the third feature map may look for a blue color blob, and so on. Different weights may be calculated for each neuron during training. A convolutional layer with 64 feature maps may be said to have a depth of 64. The height and width dimensions will depend on the image size, receptive field size, and stride. For this example, the first convolutional layer 206 may have a height and width of 224.

The other convolutional layers may work in a similar fashion, with a receptive field of various dimensions in a prior layer mapping to a neuron in a subsequent layer. The functions may be of different types in different layers, for example, pooling functions, rectified linear unit operations, and such.

The first pooling layer 210 may be a pooling layer that comprises neurons arranged in feature maps that perform a down sampling operation. A purpose of the pooling layer is to reduce the amount of data to process. Each neuron in the first pooling layer 210 has a receptive field in the second convolutional layer 208. For example, a neuron could have a receptive field of 2×2 neurons meaning it processes the output of those four neurons. In a max pooling operation, the highest value of the four values produced by neurons in the 2×2 grid within the receptive field may be selected by the activation function of a single neuron in the first pooling layer 210. The output of this neuron may be the highest value.

In each type of deep model, training is used to fit the model output to the training data. In particular, weights associated with each neuron in the model may be updated through training. Originally, the model may comprise random weight values that are adjusted during training. In one embodiment, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. Each labeled image is input to the model and used to train it. Once a sufficient number of training images are fed to the network, then the training may stop. The neural network may then be used to generate an embedding.

The training data used should have subject matter that is similar, when possible, to the images for which embeddings are desired because the CNN will learn to identify and weight the most relevant image features. In the case of an e-commerce platform, it may be desirable to train the CNN using a corpus of product images assigned a classification, such as dress, pants, shoe, skirt, jacket. The CNN can be trained to classify these images into categories associated with the label.

Figure 3A:
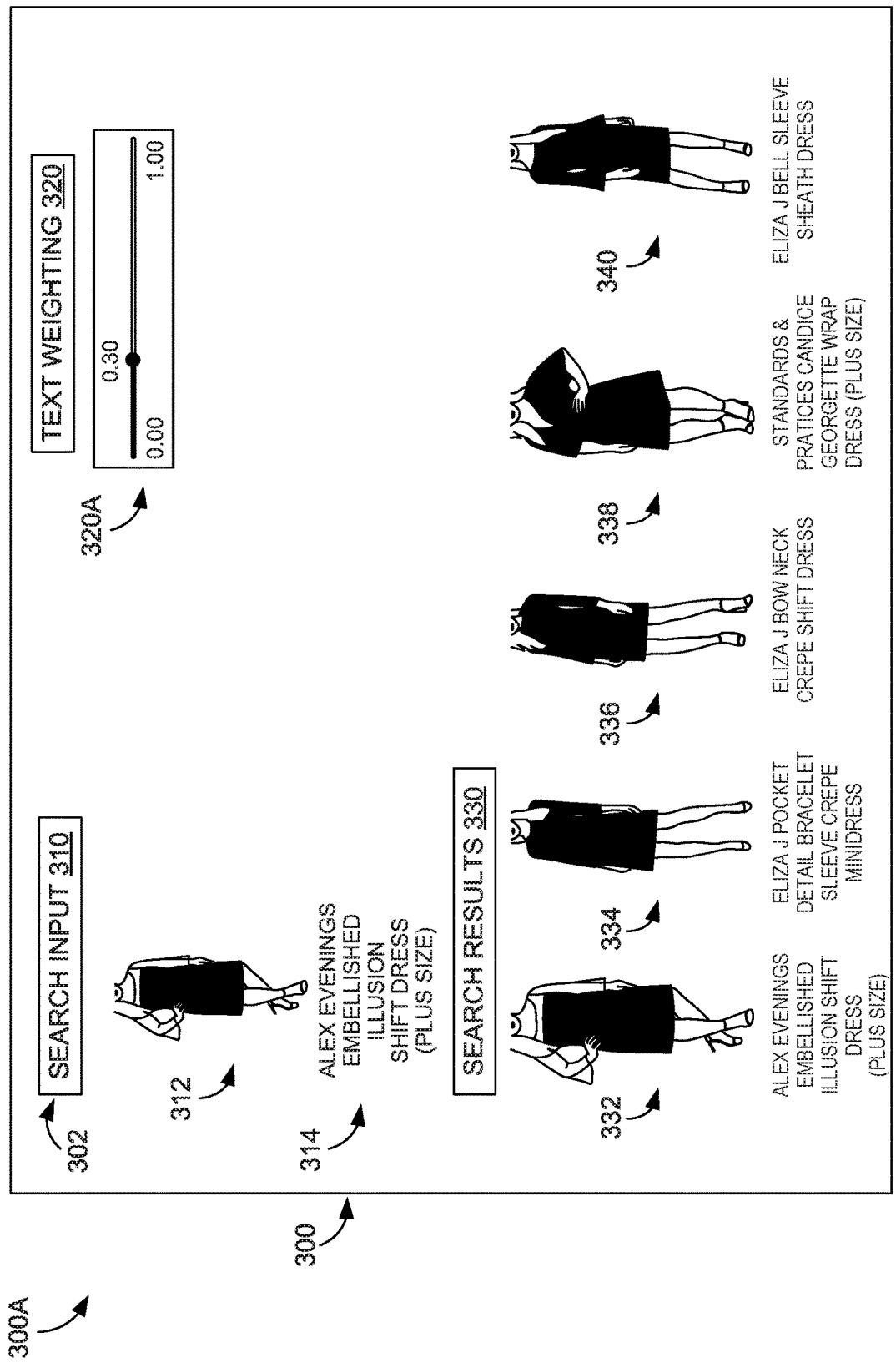
FIG. 3A is an illustration of an example visual search interface with low textual weighting, in accordance with embodiments of the technology described herein.
Figure 3B:
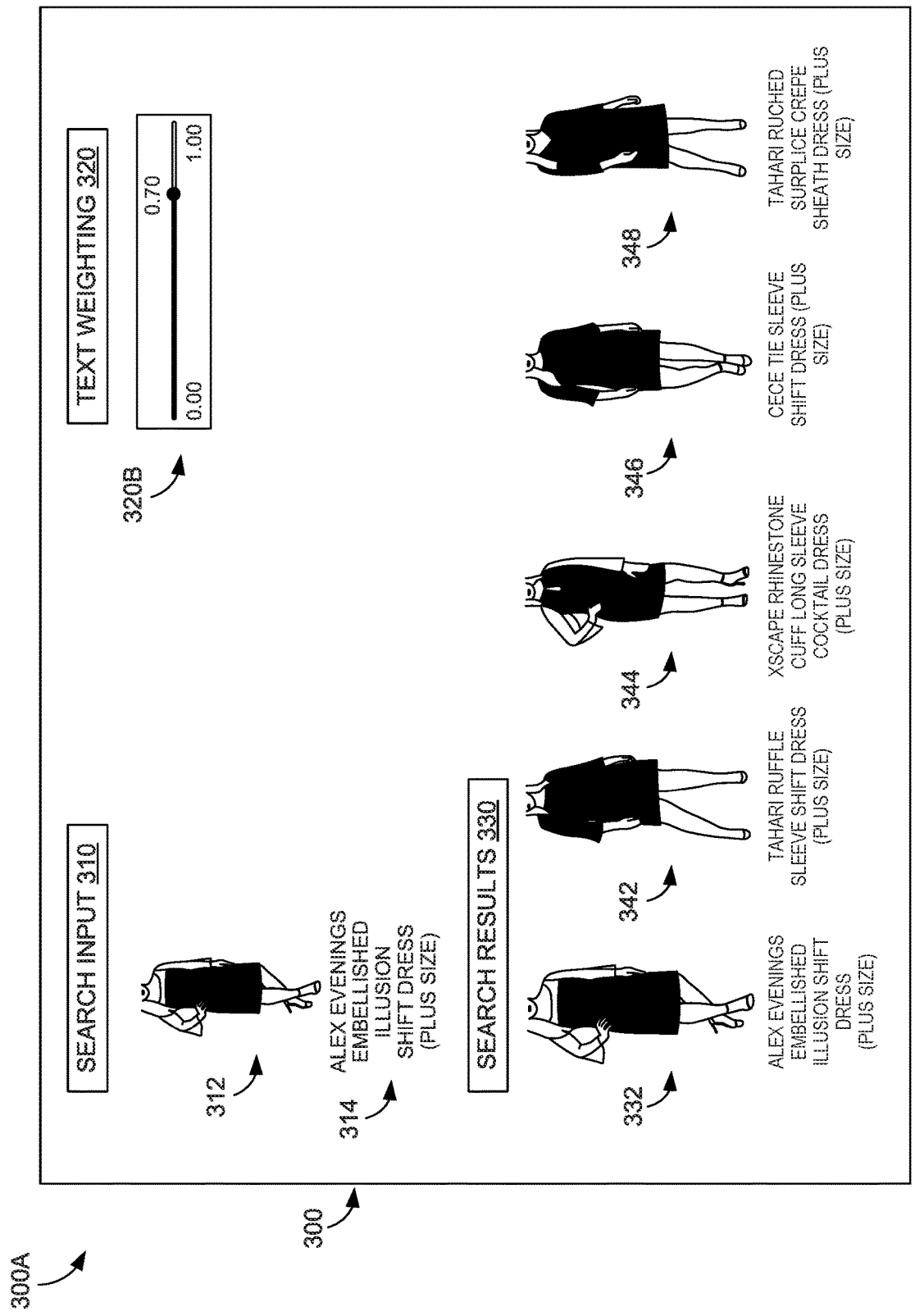
FIG. 3B is an illustration of an example visual search interface with high textual weighting, in accordance with embodiments of the technology described herein.

Turning now to FIGS. 3A and 3B, the use of a user adjustable weighting control is illustrated, according to embodiments of the technology described herein. FIG. 3A illustrates a non-customized search scenario 300A. The browser window 300 shows a search interface 302. The search interface 302 includes a search input area 310 showing a search image 312 of a woman wearing a black dress and accompanying description 314. The description 314 includes the phrase "plus size." The search interface 302 also includes a search results section 330 and a text weighting control 320.

The text weighting control 320A indication shows that accompanying text is given a 30% weight when calculating the aggregate similarity score used to select and order results. In embodiments, the user may increase the text weighting by dragging the slider control 320 to the right and decrease the weight by sliding the control to the left. In an embodiment, the text weight and visual weight equal one. This means that the visual weight will be automatically increased or decreased as the text weight is adjusted. Presenting just the text weight to the user while holding the total weight at one eliminates the need for the user to adjust both weights.

The search results section 330 includes five results. The first result 332 shows the search image 312. Showing the search image as the first image may help orient the viewer and help the viewer make a side-by-side comparison. The search image 312 does not need to be shown as part of the search results in the search image 312 may be omitted from the search results in some embodiments.

The second search result 332 shows a woman wearing a black dress and is accompanied by a description that does not indicate a size, but for the sake of illustration the image in the second search result 332 does not show a plus size dress. The third search result 334 shows a woman wearing a black dress and is accompanied by a description that does not indicate a size, but the image is not of a plus size dress. The fourth search result 336 shows a woman wearing a black dress and is accompanied by a description indicating "plus size." The fourth search result 338 shows a woman wearing a black dress and is accompanied by a description that does not indicate a size, but the image is not of a plus size dress.

In total, two of the five search results show plus size dresses. If the user is not particularly interested in dress size, then the user may be pleased with the search results shown. However, if the user is shopping for plus size dresses and only wants to see images of plus size dresses, then the user could adjust the text weighting control 320 to give more weight to the description which includes a size in some cases.

FIG. 3B illustrates a customized search scenario 300B with increased weight given to text in the description of an image. As can be seen, the text weight indication 320B shows that text is given a 70% weight. In this example, the text weight increased in response to a user input. Turning to the search results 330, the result of this change are apparent. The first search result 332 again shows the search image 312. However all of the other search results are different, and they all indicate that a plus size dress is shown. The second search result 342 shows a woman wearing a black dress and is accompanied by a description indicating "plus size." The third search result 344 shows a woman wearing a black dress and is accompanied by a description indicating "plus size." The fourth search result 346 shows a woman wearing a black dress and is accompanied by a description indicating "plus size." The fifth search result 348 shows a woman wearing a black dress and is accompanied by a description indicating "plus size." The customized search scenario 300 B illustrates the power that the technology described herein gives users to customize visual searches by adjusting the weight given to textual similarity and visual similarity.

Exemplary Methods

Figure 4:
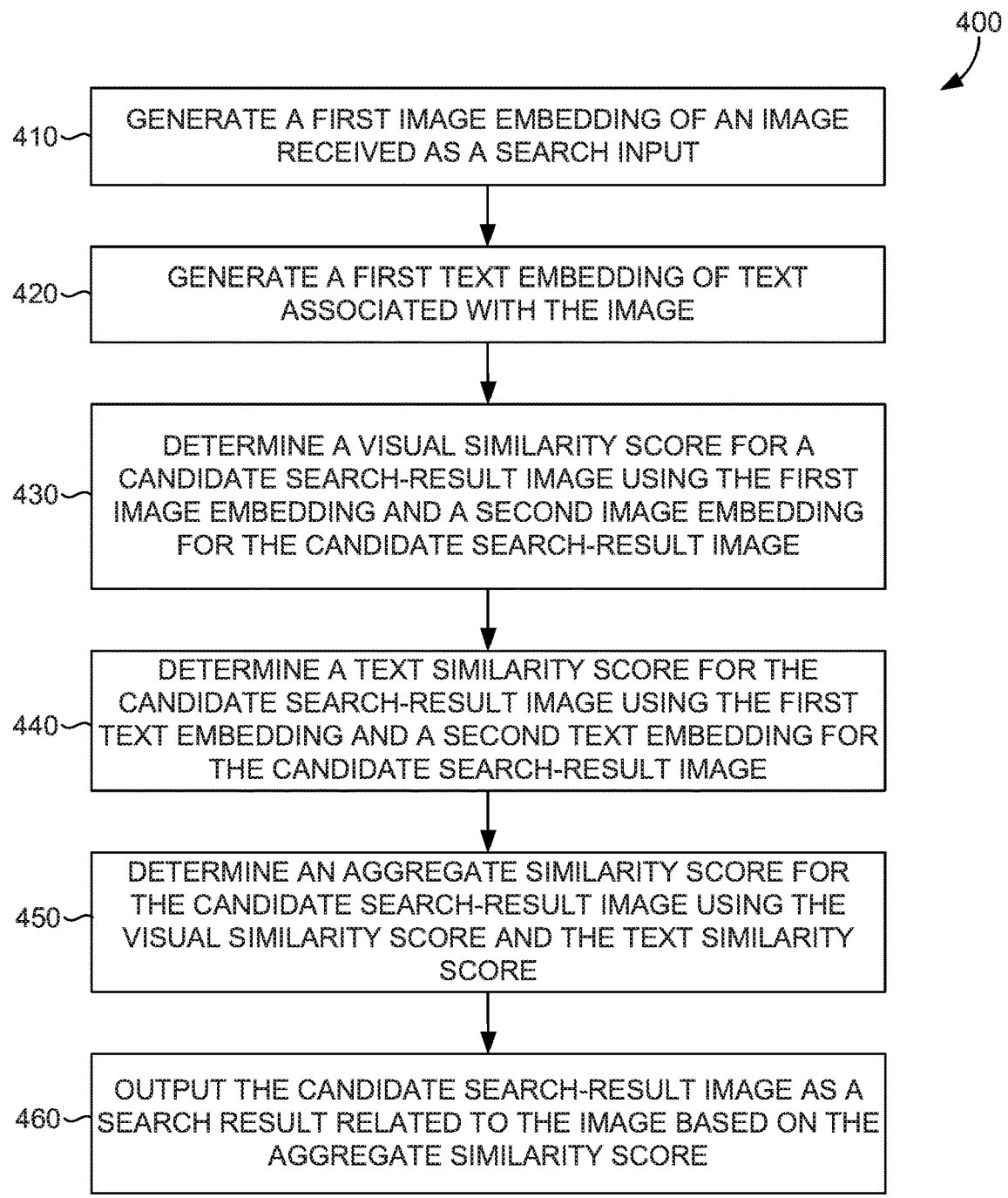
FIG. 4 provides a first example method of providing a visual search, in accordance with embodiments of the technology described herein.
Figure 5:
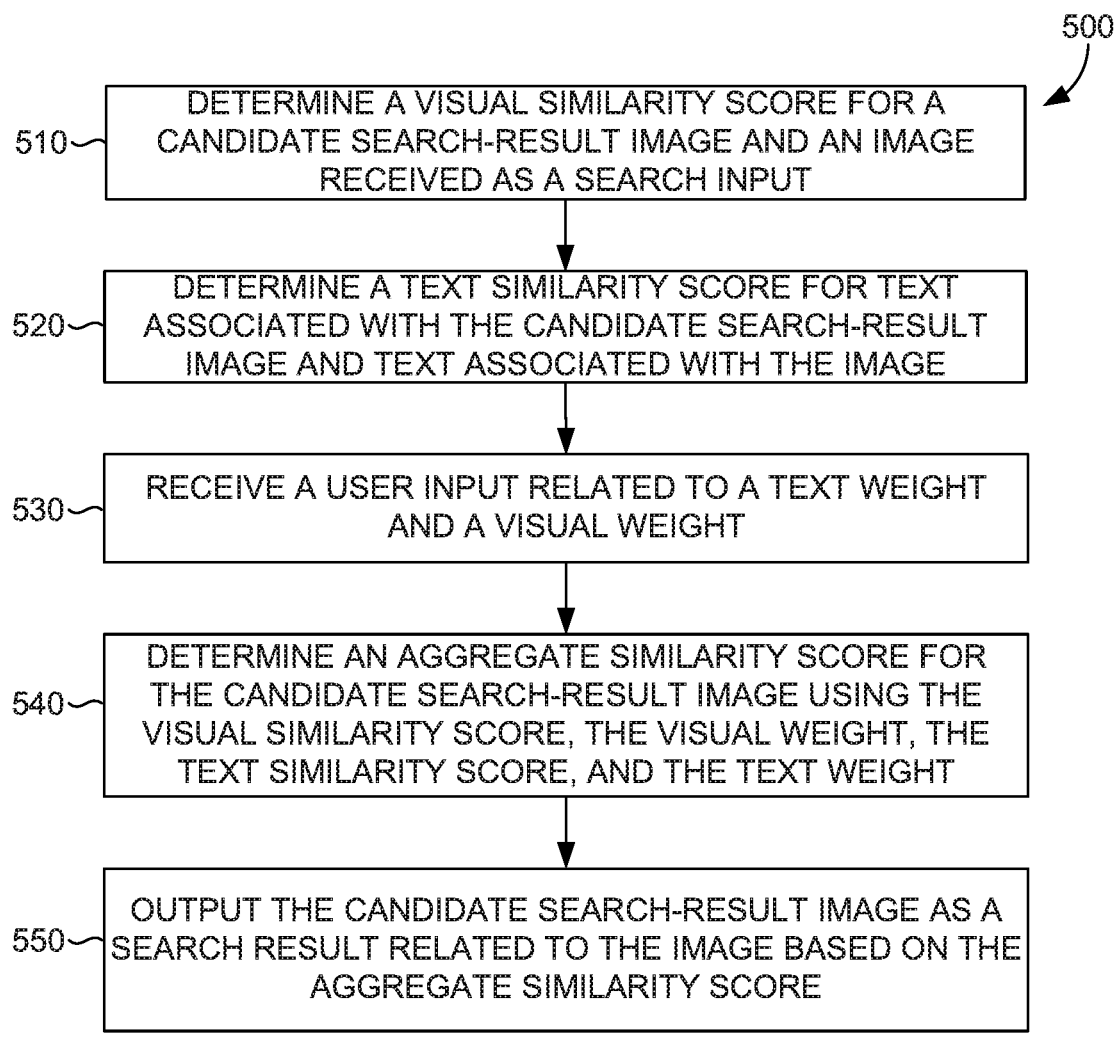
FIG. 5 provides a second example method of providing a visual search, in accordance with embodiments of the technology described herein.
Figure 6:
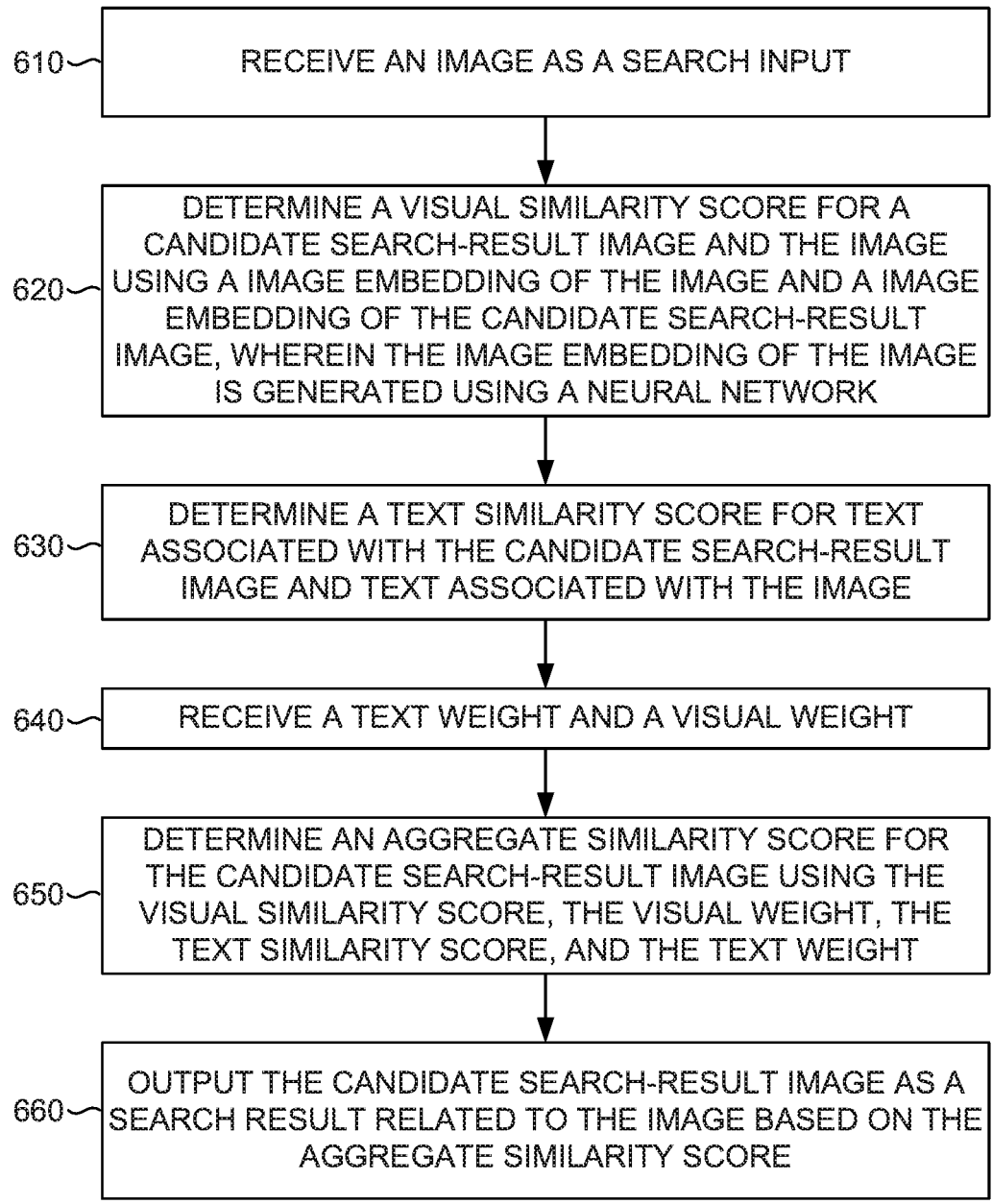
FIG. 6 provides a third example method of providing a visual search, in accordance with embodiments of the technology described herein.

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 400, 500, and 600 are described, by way of example, with respect to the visual search environment 100 of FIG. 1. However, these methods may additionally or alternatively be executed by any one system, or any combination of systems, including, but not limited to, those described herein.

FIG. 4 is a flow diagram showing a method 400 for performing a visual search, in accordance with some embodiments of the present disclosure. The method 400, at block 410 includes generating a first image embedding of an image received as a search input. In one embodiment, the first image embedding is generated prior to receiving a search input. As described previously, an embedding store receives embedding records for images in the system and stores them for later use. Regardless of timing, a visual embedding of both the search image and candidate images are generated for use in method 400.

An embedding is a translation of a high-dimensional vector into a low-dimensional space. For example, an image embedding translates image features into a vector that can be used for a similarity determination. In an embodiment, an image embedding takes the form of a feature vector, which is a representation of an image in an N-dimensional vector. The basic idea is the closer a given image is to another image the more similar their embeddings will be in spatial dimension. In one example, the embeddings are generated by neural network trained to identify both high level image features and low level image features. In general, low-level image features are minor details of the image, such as lines, edges, corners or dots. High-level features are built on top of low-level features to detect objects and larger shapes in the image.

The method 400, at block 420 includes generating a first text embedding of text associated with the image. In one example, the first text embedding is generated using a neural network that uses a character n-gram model, such as the Word2vec model. Word2vec is not a single algorithm but a combination of two techniques—CBOW (Continuous bag of words) and Skip-gram model. Both of these are shallow neural networks that map word(s) to the target variable. Both of these techniques learn weights which act as word vector representations. The text embedding converts a word or string of words into one or more vectors representing the words.

The method 400, at block 430 includes determining a visual similarity score for a candidate search-result image using the first image embedding and a second image embedding for the candidate search-result image. The visual similarity score is determined by taking a cosine similarity, L2 norm, or some other similarity measure of the first image embedding of the search image and an embedding of a candidate image. Embodiments are not limited to use with cosine similarity or L2 norm.

The method 400, at block 440 includes determining a textual similarity score for the candidate search-result image using the first text embedding and a second text embedding for the candidate search-result image. The textual similarity score is determined by taking a cosine similarity, L2 norm, or some other similarity measure of the first textual embedding of the search image and a textual embedding of a candidate image. Embodiments are not limited to use with cosine similarity or L2 norm.

The method 400, at block 450 includes determining an aggregate similarity score for the candidate search-result image using the visual similarity score and the textual similarity score. In one embodiment, an aggregate similarity score is generated for each image in the first plurality of images. In one embodiment, the aggregate similarity score is the sum of a weighted visual similarity score and a weighted textual similarity score. The weighted visual similarity score is the previously calculated visual similarity score multiplied times the visual weight. The weighted textual similarity score is the previously calculated textual similarity score multiplied times the textual weight. In one embodiment, the sum of the textual weight and visual weight is one. For example, the visual weight could be 0.7 in the textual weight could be 0.3.

These weights are adjustable by a user through a search result page. The search result page includes a control that allows the user to increase or decrease the visual weight and/or the textual weight. As the weight is adjusted by the user, the results shown change in response to a recalculation of the aggregate similarity score for search result images. The results shown are selected and ordered according to the aggregate similarity score assigned to the result. The changing weight can change both images shown and the order of images shown.

The method 400, at block 460 includes outputting the candidate search-result image as a search result related to the image based on the aggregate similarity score. The output of search-result images has been described previously with reference to FIGS. 3A and 3B.

FIG. 5 is a flow diagram showing a method 500 for performing a visual search, in accordance with some embodiments of the present disclosure. The method 500, at block 510 includes determining a visual similarity score for a candidate search-result image and an image received as a search input.

The method 500, at block 520 includes determining a textual similarity score for text associated with the candidate search-result image and text associated with the image. The textual similarity score is determined by taking a cosine similarity, L2 norm, or some other similarity measure of the first textual embedding of the search image and a textual embedding of a candidate image. Embodiments are not limited to use with cosine similarity or L2 norm.

The method 500, at block 530 includes receiving a user input related to a text weight and a visual weight. In one example, the text weight and/or visual weight are designated by a user through a search interface.

The method 500, at block 540 includes determining an aggregate similarity score for the candidate search-result image using the visual similarity score, the visual weight, the textual similarity score, and the text weight. In one embodiment, an aggregate similarity score is generated for each image in the first plurality of images. In one embodiment, the aggregate similarity score is the sum of a weighted visual similarity score and a weighted textual similarity score. The weighted visual similarity score is the previously calculated visual similarity score multiplied times the visual weight. The weighted textual similarity score is the previously calculated textual similarity score multiplied times the textual weight. In one embodiment, the sum of the textual weight and visual weight is one. For example, the visual weight could be 0.7 in the textual weight could be 0.3.

These weights are adjustable by a user through a search result page. The search result page includes a control that allows the user to increase or decrease the visual weight and/or the textual weight. As the weight is adjusted by the user, the results shown change in response to a recalculation of the aggregate similarity score for search result images. The results shown are selected and ordered according to the aggregate similarity score assigned to the result. The changing weight can change both images shown and the order of images shown.

The method 500, at block 550 includes outputting the candidate search-result image as a search result related to the image based on the aggregate similarity score. The output of search-result images has been described previously with reference to FIGS. 3A and 3B.

FIG. 6 is a flow diagram showing a method 600 for performing a visual search, in accordance with some embodiments of the present disclosure. Method 600 may be performed by a system similar to visual search engine 110.

The method 600, at block 610 includes generating a first image embedding of an image received as a search result. In one embodiment, the first image embedding is generated prior to receiving a search input. As described previously, an embedding store receives embedding records for images in the system and stores them for later use. Regardless of timing, a visual embedding of both the search image and candidate images are generated for use in method 600.

An embedding is a translation of a high-dimensional vector into a low-dimensional space. For example, an image embedding translates image features into a vector that can be used for a similarity determination. In an embodiment, an image embedding takes the form of a feature vector, which is a representation of an image in an N-dimensional vector. The basic idea is the closer a given image is to another image the more similar their embeddings will be in spatial dimension. The embedding neural network 118 is trained to identify both high level image features and low level image features. In general, low-level image features are minor details of the image, such as lines, edges, corners or dots. High-level features are built on top of low-level features to detect objects and larger shapes in the image.

The method 600, at block 610 includes receiving an image as a search input. In one embodiment, the search image is selected explicitly by a user as an input for a visual search. For example, a website offering a visual search service based on images presented by the website may provide instructions to a user inviting the user to select an image as a search input. In the case of a client-side application generating the actual search interface, the client-side application will communicate the search image and/or identification information for the image over the network to the visual search system performing method 600.

The method 600, at block 620 includes determining a visual similarity score for a candidate search-result image and the image using an image embedding of the image and an image embedding of the candidate search-result image. The image embedding of the search image and the candidate images are generated using a neural network. The neural network may be a convolutional neural network. An embedding is a translation of a high-dimensional vector into a low-dimensional space. For example, an image embedding translates image features into a vector that can be used for a similarity determination. In an embodiment, an image embedding takes the form of a feature vector, which is a representation of an image in an N-dimensional vector. The basic idea is the closer a given image is to another image the more similar their embeddings will be in spatial dimension. An embedding neural network is trained to identify both high level image features and low level image features. In general, low-level image features are minor details of the image, such as lines, edges, corners or dots. High-level features are built on top of low-level features to detect objects and larger shapes in the image.

The method 600, at block 630 includes determining a textual similarity score for text associated with the candidate search-result image and text associated with the image. The text similarity is based on text embeddings generated by a neural network in one example. A text embedding neural network may use a character n-gram model, such as the Word2vec model. Word2vec is not a single algorithm but a combination of two techniques—CBOW (Continuous bag of words) and Skip-gram model. Both of these are shallow neural networks that map word(s) to the target variable. Both of these techniques learn weights which act as word vector representations. The text embedding converts a word or string of words into one or more vectors representing the words.

The method 600, at block 640 includes receiving a text weight and a visual weight. In one example, the text weight and/or visual weight are designated by a user through a search interface.

The method 600, at block 650 includes determining an aggregate similarity score for the candidate search-result image using the visual similarity score, the visual weight, the textual similarity score, and the text weight. In one embodiment, an aggregate similarity score is generated for each image in the first plurality of images. In one embodiment, the aggregate similarity score is the sum of a weighted visual similarity score and a weighted textual similarity score. The weighted visual similarity score is the previously calculated visual similarity score multiplied times the visual weight. The weighted textual similarity score is the previously calculated textual similarity score multiplied times the textual weight. In one embodiment, the sum of the textual weight and visual weight is one. For example, the visual weight could be 0.7 in the textual weight could be 0.3.

These weights are adjustable by a user through a search result page. The search result page includes a control that allows the user to increase or decrease the visual weight and/or the textual weight. As the weight is adjusted by the user, the results shown change in response to a recalculation of the aggregate similarity score for search result images. The results shown are selected and ordered according to the aggregate similarity score assigned to the result. The changing weight can change both images shown and the order of images shown.

The method 600, at block 660 includes outputting the candidate search-result image as a search result related to the image based on the aggregate similarity score. The output of search-result images has been described previously with reference to FIGS. 3A and 3B.

Exemplary Operating Environment

Figure 7:
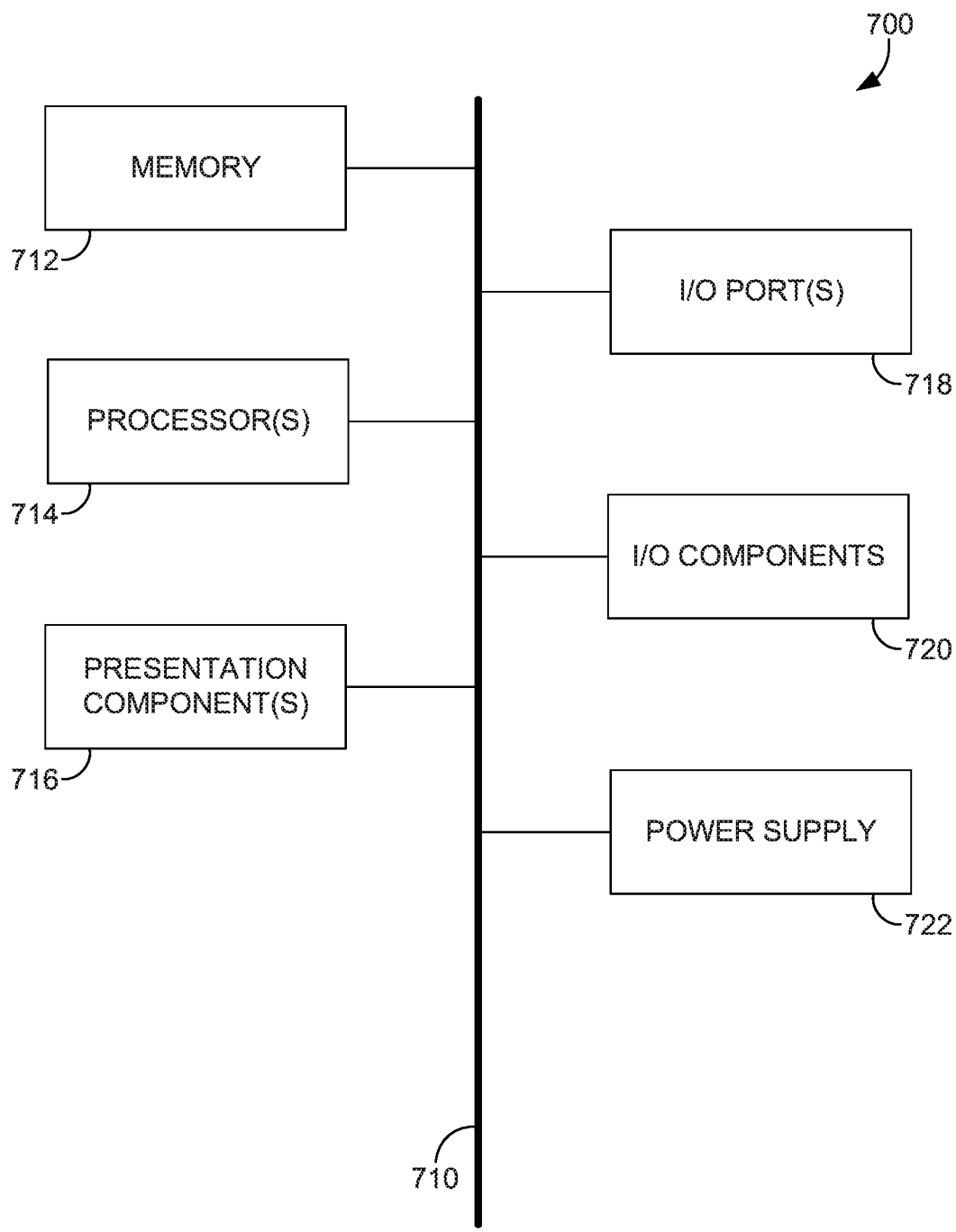
FIG. 7 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine-learning is a field of study that gives computers the ability to learn without being explicitly programmed. Machine-learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combinations of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented visual search method, the method comprising:
generating, using a neural network, a first image embedding of an image received as a search input;
generating a first text embedding of text associated with the image;
determining a visual similarity score for a candidate search-result image using the first image embedding and a second image embedding for the candidate search-result image;
determining a textual similarity score for the candidate search-result image using the first text embedding and a second text embedding for the candidate search-result image;
receiving a user input to decrease a text weight and increase a visual weight;
determining an aggregate similarity score for the candidate search-result image using the visual similarity score, the visual weight, the textual similarity score, and the text weight; and
outputting the candidate search-result image as a search result related to the image based on the aggregate similarity score.

2. The method of claim 1, wherein determining the aggregate similarity score comprises: multiplying the text weight by the textual similarity score to generate a weighted textual similarity score; multiplying the visual weight by the visual similarity score to generate a weighted visual similarity score, and adding the weighted textual similarity score and the weighted textual similarity score to form the aggregate similarity score.

3. The method of claim 1, wherein generating the aggregate similarity score comprises: multiplying the text weight by the textual similarity score to generate a weighted textual similarity score, multiplying the visual weight by the visual similarity score to generate a weighted visual similarity score, and adding the weighted textual similarity score and the weighted textual similarity score to form the aggregate similarity score.

4. The method of claim 1, wherein the relevance rank is assigned without reference to user interaction data with the image.

5. The method of claim 1, wherein the first image embedding is generated using a neural network.

6. The method of claim 1, wherein the text is a title of the image.

7. One or more computer-storage media having computer-executable instructions embodied thereon that, when executed by a computing system having a processor and memory, cause the processor to:
determine a visual similarity score for a candidate search-result image and an image received as a search input;
determine a textual similarity score for text associated with the candidate search-result image and text associated with the image;
receive a user input to decrease a text weight and increase a visual weight;
determine an aggregate similarity score for the candidate search-result image using the visual similarity score, the visual weight, the textual similarity score, and the text weight; and
output the candidate search-result image as a search result related to the image based on the aggregate similarity score.

8. The media of claim 7, wherein the method further comprises:
  generate a first image embedding of the image; and
  determine the visual similarity score using the first image embedding and a second image embedding for the candidate search-result image.

9. The media of claim 8, wherein the method further comprises:
  generate a first text embedding of text associated with the image; and
  determine the textual similarity score for the candidate search-result image using the first text embedding and a second text embedding for the candidate search-result image.

10. The media of claim 7, wherein generating the aggregate similarity score comprises: multiplying the text weight by the textual similarity score to generate a weighted textual similarity score, multiplying the visual weight by the visual similarity score to generate a weighted visual similarity score, and adding the weighted textual similarity score and the weighted textual similarity score to form the aggregate similarity score.

11. The media of claim 7, wherein the relevance rank is assigned without reference to user interaction data with the image.

12. The media of claim 7, wherein the user input is received through a slide control displayed on a search interface.

13. The media of claim 7, wherein generating the aggregate similarity score comprises: multiplying the text weight by the textual similarity score to generate a weighted textual similarity score, multiplying the visual weight by the visual similarity score to generate a weighted visual similarity score, and adding the weighted textual similarity score and the weighted textual similarity score to form the aggregate similarity score.

14. A method comprising:
  receiving an image as a search input;
  determining a visual similarity score for a candidate search-result image and the image using an image embedding of the image and an image embedding of the candidate search-result image, wherein the image embedding of the image is generated using a neural network;
  determining a textual similarity score for text associated with the candidate search-result image and text associated with the image;
  receiving a text weight and a visual weight;
  determining an aggregate similarity score for the candidate search-result image using the visual similarity score, the visual weight, the textual similarity score, and the text weight; and
  outputting the candidate search-result image as a search result related to the image based on the aggregate similarity score.

15. The method of claim 14, wherein the method further comprises:
  generating a first text embedding of text associated with the image; and
  determining the textual similarity score for the candidate search-result image using the first text embedding and a second text embedding for the candidate search-result image.

16. The method of claim 14, wherein the text weight and the visual weight is received from a user who submitted the image as the search input.

17. The method of claim 14, wherein generating the aggregate similarity score comprises: multiplying the text weight by the textual similarity score to generate a weighted textual similarity score, multiplying the visual weight by the visual similarity score to generate a weighted visual similarity score, and adding the weighted textual similarity score and the weighted textual similarity score to form the aggregate similarity score.

18. The method of claim 14, wherein the neural network is a convolutional neural network.

19. The method of claim 14, wherein the relevance rank is assigned without reference to user interaction data with the image.

* * * * *